United States Patent [19]

Everett et al.

[11] 3,916,096

[45] Oct. 28, 1975

[54] ELECTRONIC SCREENING

[75] Inventors: Robert Charles Everett; Paul Anthony Beaufort Radcliffe; Alfred Henry Robinson; Janusz Andrew Veltze, all of London, England

[73] Assignee: International Publishing Corporation Ltd., London, England

[22] Filed: Feb. 8, 1974

[21] Appl. No.: 440,733

[30] Foreign Application Priority Data

Feb. 13, 1973 United Kingdom ................. 7116/73

[52] U.S. Cl. .......... 178/6.6 R; 178/6.6 B; 178/6.7 R

[51] Int. Cl.$^2$ ............................................ G03F 7/00

[58] Field of Search ............ 178/6.6 R, 6.6 B, 6.7 R

[56] References Cited

UNITED STATES PATENTS

| | | | |
|---|---|---|---|
| 3,043,906 | 7/1962 | Hassing | 178/6.6 B |
| 3,465,199 | 9/1969 | Simshauser | 178/6.6 B |
| 3,482,039 | 12/1969 | Valentin et al. | 178/6.6 B |

*Primary Examiner*—Raymond F. Cardillo, Jr.
*Attorney, Agent, or Firm*—Brisebois & Kruger

[57] ABSTRACT

This invention relates to a method and apparatus for the electronic screening of a graphic image to be reproduced by printing. The density of the graphic image is determined either repetitively or continuously during the generation of each dot which will form a part of the half-tone image when produced, and the dot is modified according to changes in the density. Thus the structure of any half-tone dot may be modified during its construction. Electronic screening processes are also disclosed employing a random number generator to break up repetitive patterns which occur during screening and in which the random number generator produces small dots which are much smaller in size than the normal size of half-tone screen dots and whose distribution in a reproduced half-tone image varies with the density of the graphic image being screened.

4 Claims, 15 Drawing Figures

ELECTRONIC SCREENING

BACKGROUND OF THE INVENTION

The reproduction of graphic images by printing methods such as letterpress or offset lithography, for example, is effectively a binary process, that is one decides simply whether or not to put down opaque ink on a particular small area of the printing stock. In general, it is not practicable to reproduce tone variations by controlling the amount of ink applied at any point.

Traditionally the technique of optical screening has been used to reproduce tone variations. A screen consisting of a mesh of strips of controlled opacity is placed between the illuminated original image recorded on film and some unexposed photo-sensitive material. Diffraction at the screen, causes the image to break up into small regions known in the art as dots, whose area corresponds to the local optical density of the original. The dot image is recorded on the sensitive surface and forms, after development, what is commonly known as a half-tone image. Those skilled in the art will know of the many different types of optical screen that are available and the alternative methods for locating the screen with respect to the original image, as well as the need for high contrast recording of the diffracted image.

Recently electronic apparatus has become available for processing graphic images for printing and related reproduction techniques, and those familiar with these systems will be aware that electronic equivalents of the optical screening process can be devised so that screening may be accomplished by electronic modification of the electrical signal that represents the image within such apparatus.

Most of the electronic systems referred to above employ a cathode ray tube to form the final image on the photosensitive material, which is subsequently used to make the actual printing surface. For example an electronic screening method has been proposed which involves the generation of half-tone dots in the final image by means of a micro-scanning pattern on the face of the cathode ray tube. Electronic devices are used to provide special waveforms for the control of the cathode ray tube light spot, so that the latter generates a series of dot-images analogous to the rows of dots that would be formed by an optical screen.

SUMMARY OF THE INVENTION

The present invention provides novel techniques for half-tone image generation which offer improvements over existing methods. Although the particular embodiments described relate to line-scan image reproduction such as that employed, for example, in facsimile equipment, it is to be understood that the techniques of the invention are also valid for other methods of image reconstruction. Moreover, this invention is concerned with improving the fidelity of electronic reproduction systems which deal with half-tones, especially with respect to reproducing detail. To this end, the invention provides a technique for frequently updating the screening process, so that the structure of any half-tone dot may be modified during its construction, instead of, as in other processes used hitherto, simply choosing the dot size on the basis of one density reading or sample of the input video signal for each dot. It will be appreciated in the latter case, that even if this choice of dot size is made on the basis of a density measurement integrated over the distance corresponding to the screen pitch, detail variations within the integration area will be lost.

It is possible to improve detail reproduction with any screening process by decreasing the screen pitch, but this increases the difficulty of obtaining accurate tone reproduction. The present invention allows inter alia the benefits of coarse screens to be retained whilst providing good spatial detail reproduction.

The invention also contemplates the abolition of half-tone dots as such, altogether, particularly where good quality colour reproduction is required. To this end the invention also provides a system incorporating a random - number generator. With this method, there is no unique relationship between the size of dot and the density of the original at the corresponding point. Instead, small dots (much smaller than the normal screen dot) are laid down in a random fashion, so that in an area of the reproduction corresponding to an optically dense part of the original, for example, there is a greater spatial density of dots than for a lighter part of the original. There is no regular dot structure and the dots are subliminal at normal viewing distances. For example, a screen pattern of 100 lines/inch pitch subtends at the eye at a normal reading distance (10 inches) an angle of 1/17° per cycle. Patterns made up of spatial frequencies higher than about 30 cycles per degree of arc and dots subtending less than one minute of arc at the eye, are normally not resolvable. Those skilled in the art will know that colour printing involves the superposition of at least two screened images with the attendant risk of pattern interference. When the images have no regular structure, this interference cannot occur.

The screening apparatus to be described was also designed with the further aim of providing an electronic screening technique which can be used without adaption, in contrast with the prior art methods, for processes depending on the line-scan image reconstruction.

Finally, in connection with line-scan reproduction, there is described a novel variation of analogue half-tone screen generation which allows improved fidelity in detail reproduction.

The invention also provides a method and apparatus for electronic screening which consists in determining the density of a graphic image either repetitively or continuously during the generation of each dot and modifying the dot according to changes in the density.

Where repetitive determination is employed this may be achieved by digital sampling of the density. Alternatively, continuous determination may be achieved by analogue techniques.

According to one form of the invention, each dot is produced within a predetermined area composed of a number of sub-areas and the size of the dot depends upon the number of sub-areas which are of one density and the number which are of a second density. More specifically the two densities are respectively represented by opaque and transparent regions.

According to another form of the invention, a random number generator may be employed to break up repetitive patterns which can occur during screening. The random number generator produces small dots which are much smaller than the normal screen dots and whose distribution varies with the density of the graphic image being screened. As the density of the graphic image increases so does the number of small dots in a corresponding area.

According to yet another form of the invention, variable dot size screening may also be achieved by processing continuously waveforms, for example a sawtooth waveform, or a combination of two or more sawtooth waveforms.

BRIEF DESCRIPTION OF THE DRAWINGS

The invention will now be described further, by way of example, with reference to the accompanying drawings, in which.

DESCRIPTION OF THE PREFERRED EMBODIMENTS

Figure 1A:
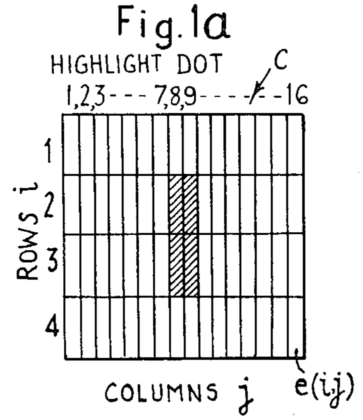
FIG. 1*a*, 1*b* and 1*c* are diagrams illustrating electronic screen dots.
Figure 1B:
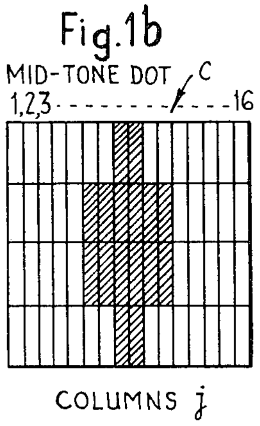
Figure 1C:
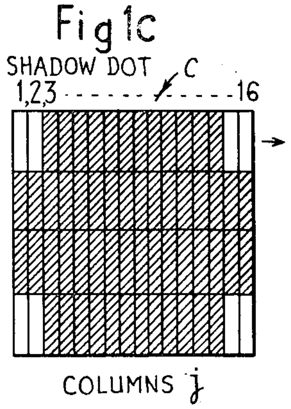

Referring to the drawings, FIGS. 1*a* 1*b* and 1*c* illustrate some examples of electronic screen dots designed for digital image reproduction. Each dot is formed within a cell C which is defined as an array of smaller elements *e*. In accordance with the known properties of the eye, the array size as a whole is not obtrusive at normal viewing distances. Further, in order to minimise the visibility of aliassing and other related effects, the number of elements in the array is made as large as conveniently possible. It is characteristic of the digital half-tone generating systems known in the art that each particular dot, corresponding in the present case to a particular selection of elements within the array, is laid down as an entity. That is the incoming video signal is examined by sampling this signal, or a counterpart of this signal integrated over time, and making a decision as to the dot required. This decision is made once for each dot. An important feature of the present invention is that this choice may be modified during the construction of the dot and more specifically the decision can be changed each time an element is laid down. Since the screened output signal is now rapidly unpated with respect to changes in the video input signal, details in the original image are reproduced with greater fidelity than possible with the digital systems at present used. The greater the number of elements within an array, the more closely can details in the original image be reproduced.

Figure 2:
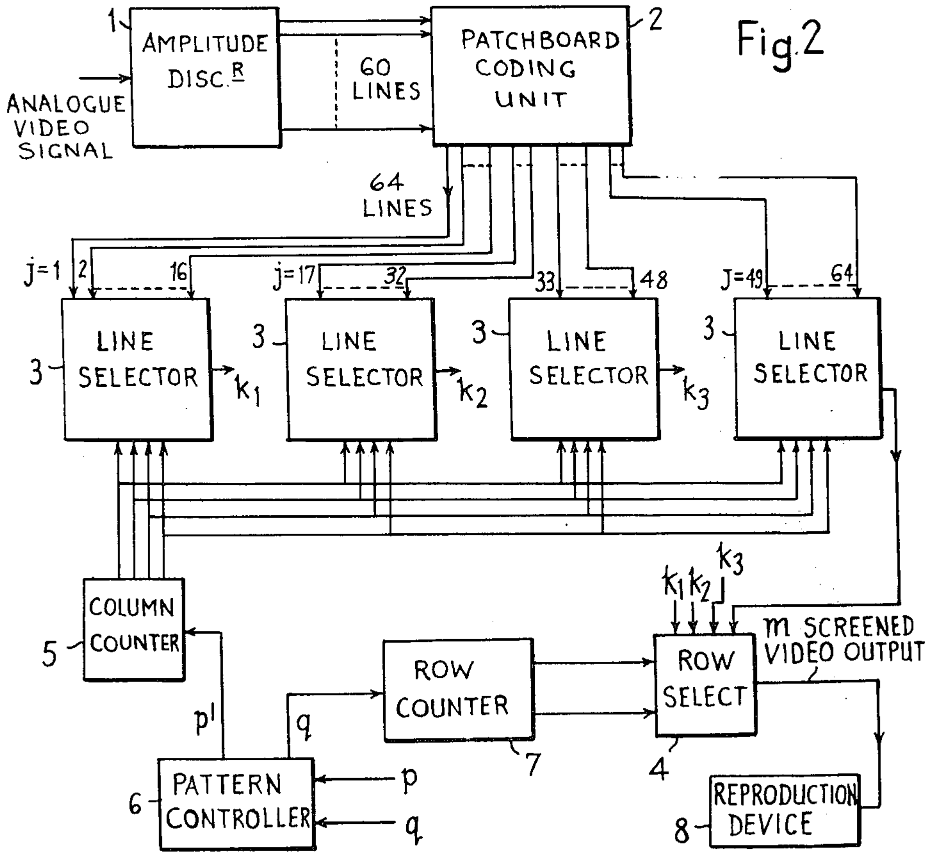
FIG. 2 is a block diagram of one embodiment of apparatus according to this invention.

FIG. 2 is a schematic diagram of one embodiment of apparatus operating on this principle. The dots in this example correspond to a conventional screen of 71 rules per inch and are based on a square array of 1/100 inch side consisting, as shown in FIG. 1, of 4 rows of 16 columns each, making 64 elements in all. Each element *e* may be identified by its row number, i, and its column number, *j*, thus: *e*(*i,j*). Dots of this form may be used for newspaper printing.

FIG. 1*a* shows a highlight dot made up of 4 elements *e*(2,8), *e*(2,9), *e*(3,8), *e*(3,9). FIG. 1*b* illustrates a mid-tone, and 1*c* represents a shadow dot. It can be seen that some elements, for example, *e*(2,8), may be used in every dot. In essence the function of the apparatus illustrated in FIG. 2, is to code the amplitude of the incoming electrical signal representing the optical density of the original image into a pattern of elements *e* which will form an appropriate screen dot in the reproduction.

Referring to FIG. 2, an amplitude discriminator 1 decides which preset amplitude level, out of 60 in this example, most closely approximates to the amplitude of the income video signal. Actual patterns of elements to represent each of these levels are selected in advance and this information, expressed in terms of element row and column addresses, is stored in the form of interconnections within the patchboard coding unit 2. It will be appreciated that alternative patterns can be chosen at any time and the unit repatched. The patchboard 2 then received 60 input lines from the discriminator 1 and connects each of these input lines to, in practice, at least 4 of 64 output lines *j*. Each line conveys a binary message. These output lines are grouped in 4 sets of 16 and, according to the pattern under construction at the time, several of these lines *j* will be true in response to one of the 60 discriminator lines being true. Each set of 16 lines *j* corresponds to a row, *i*, in the pattern.

If for example the mid-tone pattern shown in FIG. 1*b* is to be the output, elements *e*(1,8), *e*(1,9), *e*(2,6), *e*(2,7), *e*(2,8), *e*(2,9), *e*(2,10), *e*(2,11) and so on for the third and fourth rows are needed. Therefore in the first set of 16 lines, *j* coming from the patchboard, 2, lines 7 and 8 would be true. In the second set of 16 lines *j*, lines 5,6,7,8,9, and 10 would be true, and so on for the third and fourth set.

Four one-from-sixteen line selectors 3 are provided, one selector for each row. The column counter 5, provides a 4-wire address connected in parallel to each selector 3 to identify which input line *j* is to be connected to the single output line *k* in each selector. The timing is such that the lines *k*(1), *k*(2), *k*(3), *k*(4), describe a complete column in the array such as *e*(1,1) *e*(2,1), *e*(3,1), *e*(4,1). The row selector unit 4 then connects one of the lines *k* to the output line *m* which conveys what is now the screened video signal to the reproduction system 8.

The timing and synchronisation of the process is effected through the operation of the column counter 5, the pattern controller 6, and the row counter 7. The signals synchronising the screening apparatus to the composition equipment, which functions in a line scan mode, are the scan clock signal *p* and the scan start signal *q*, and may be generated by the composition equipment which itself may be synchronised with the image reproduction device.

The signal *q* may be a pulse which is simply conveyed by the controller 6 direct to the row counter 7. This counter, of conventional design, recycles every 4 pulses to provide a repeating, two-wire address sequence 1,2,3,4,1,2,3,4 et seq. for the row selector 4. Thus, as the reproducing device performs a sequence of scans across the final image, co-linear with the rows, $i$ in the dot array, the screening apparatus is able to complete the imposition of a row of dots across the image every 4 scans. Each dot is built up a row at a time, each row is made up of a string of columns, starting with column 1 and progressing to 16. The column counter 5 is a recycling counter of conventional design, which counts the clock pulses $p$, each pulse being arranged to correspond with the imposition of a single element $e$ $(i. j)$. The counter 5 recycles every 16 clock pulses. Thus the output line $m$ is connected to each of the 64 lines $j$ in turn, working from left to right and top to bottom of the array.

It will be appreciated that in this way the dot may be modified so that it contains parts of many stored patterns if the density of the original image changes rapidly.

Figure 3:
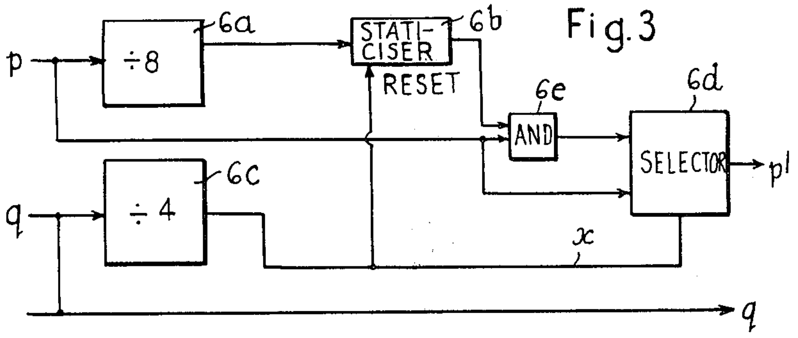
FIG. 3 is a block diagram of a pattern controller.

The pattern controller 6 specifies the location of successive rows of dots with respect to each other. For example, every second row of dots may be displaced by half an array width if this module is as shown in FIG. 3. In this Figure the pattern controller comprises a divide-by-8 circuit 6$a$ fed with the scan clock signals $p$ and producing an output fed to the staticiser 6$b$ which is a one-bit memory, such as a flip-flop. The scan start signal $q$ is fed through a divide-by-4 circuit 6$c$ whose output forms a reset signal to the staticiser and also drives the selecter 6$d$. This latter circuit selects either input A or input B according to the state of line $x$. Input A is the output from on AND gate 6$e$ which is fed with the input from the staticiser and the scan clock signals and represents the scan clock signal delayed by eight counts with respect to the incoming clock signal p which appears on the other input B. The output from the selector is the signal $p^1$ which is identical with signal $p$ but delayed by eight counts.

The dots in this instance form an hexagonal array which is unobtrusive to the eye compared with the vertical pattern, for example, which results when the dot centres fall on lines that are parallel with vertical lines in the original image. Other arrays may be produced and the structure changed from the $16 \times 4$ system illustrated, for example to $16 \times 8$ or $12 \times 6$, and so on.

In cases where the mix of work going through the image reproduction device requires frequent changes of structure or sets of patterns, the making of interconnections within the patchboard coding unit 2 may be directly controlled by an electronic computer which conveniently stores in its memory the many possible combinations of connections within the coding unit. Such an arrangement avoids the time delays associated with manual re-patching of the coding unit 2, or the need to have many pre-patched boards available at the same time.

The pattern controller may also be used to control the alignment of the screening of one image with respect to the orientation of the screen on the preceding image, or images, as would be required for colour reproduction. In this case the controller 6 would have a slightly different structure to that shown in FIG. 3 in order to generate, say, a 15°, 30° and 45° orientation for the respective colour components.

With 4-colour printing, those skilled in the art will be aware that it is not possible to remove all pattern interference by suitable orientation of the successive images. The apparatus described above can generate different screen dot patterns for each separation image, as well as controlling the dot orientation which considerably lessens the obtrusiveness of pattern interference. However, complete removal of pattern interference can be obtained by using random or pseudo-random techniques.

Random screening has a further advantage in that it offers a flexible means for redistributing the errors inherent in a quantizing system in order to minimise its effect on reproduction quality. For example, the known principle of introducing a 'dither' signal to break-up contours caused by amplitude quantizing.

With pseudo-random techniques, the reproduced image consists of a pseudo-random pattern of very small dots (much smaller than the normal screen dots) distributed in such a way that the average spatial density of these dots follows the optical density of the original, in the absence of deliberate tone correction. In practice, before the signal representing the graphic image is passed to the screening unit it will generally be deliberately distorted to compensate for the effects of the subsequent screening, photographic recording and printing processes on the density range and detailed contrast of the original graphic image. In the following description it is to be understood that reference to the original graphic image may include such image when so deliberately distorted.

In the scanning system, the probability that a dot will be laid down in the reproduced image must be a linear function of the intended percentage light transmission (or reflection), i.e., for a percentage transmission of 80 percent, then the probability that a dot will be put at that point must be $100 - 80 = 20$ percent.

Figure 4:
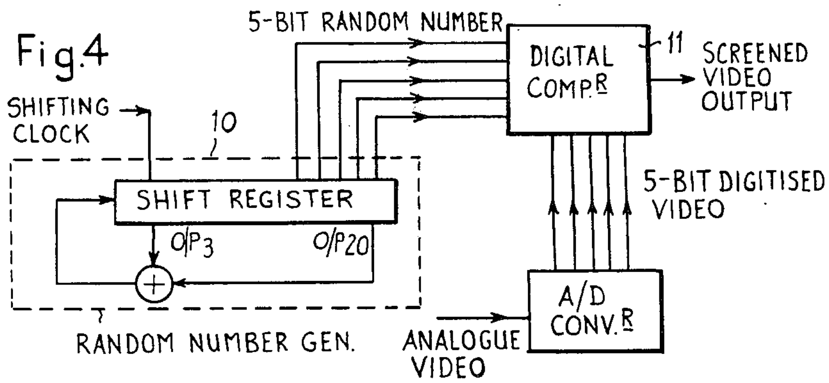
FIG. 4 is a block diagram of a random number generator and digital comparison circuit.

In order to do this, the pseudo random signal must be generated with a well-defined probability density function, i.e., the probability of any particular level occurring at a particular time has to be constant. A random signal could be generated by an anologue noise source, such as a neon noise tube or a zener diode, a simple and acceptable alternative is to use a pseudorandom code generator. It has been proposed in the art (see for example J. E. Thomson Ph.D., Imperial College thesis 1968) that such a generator may conveniently consist of a long digitial shift register with the input fed from a modulo-2 adder operating on two of the outputs of the shift register. This is shown at 10 in FIG. 4.

These outputs may be chosen so that the shift register goes through a maximum-length cycle, i.e., for an N-bit shift register, the contents will cycle through $2^N - 1$ possible states. Any output from the register will give a one-bit pseudo - random number which is a close approximation to truly random if N is large enough in the sense that there is no way of predicting the next value of the output except by observing the outputs over one complete cycle, which for a 20 bit register is over a million states long, and any P outputs together will give a P-bit random number. For a maximum length cycle this P-bit number will take all values from zero to $2^P - 1$ randomly. In a complete cycle, all these numbers will occur an equal number of times. Thus the probability of any particular number occuring is 1/2 P i.e., there is a uniform probability density function.

Figure 5:
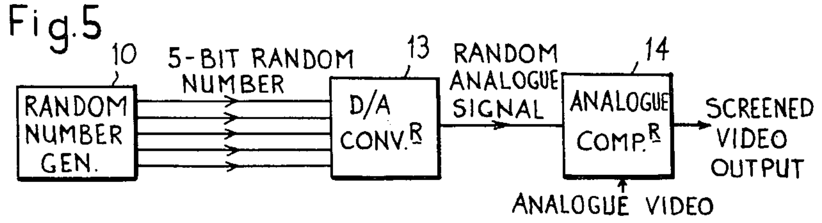
FIG. 5 is a block diagram of a random number generator and analogue comparison circuit.

To determine whether or not a dot shall be laid down at a particular point or not, one must compare the amplitude of the random number with the amplitude of the income video signal representing the original image; if it is greater, then a dot will be laid down. Thus, the probability of writing a dot is a linear function of the amplitude of the video signal. The comparison may be done digitally by digitising the video signal and comparing it numerically with the random number in comparator 11 or, if more convenient. as shown in FIG. 5, analogue-wise by feeding the random number into a P bit digital to analogue converter 13 to give a $2^P$ level signal and using an analogue comparator 14.

Figure 6:
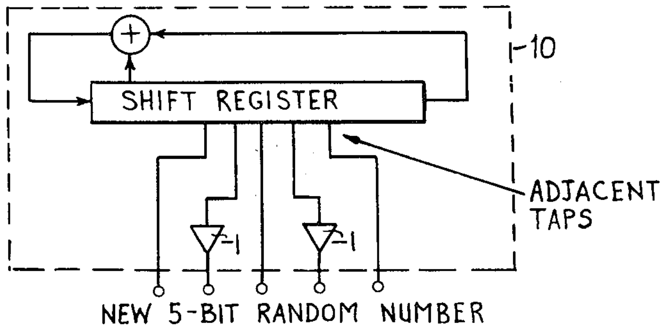
FIG. 6 is a further embodiment of random number generator.

A "white" random noise signal can be considered as a signal that contains all frequency components from zero to as high as the bandwidth of the system under consideration allows, in equal amounts. If a white random noise signal is printed it appears lumpy and granular rather like a photograph of a concrete surface. If however the low spatial frequency components of the signal are removed by filtering to produce what is known as "pink" noise then the printed picture appears less granular. Indeed if all the noise frequency components that are resolvable by the eye (i.e., below about 30 cycles/degree) are removed, then the picture appears uniformly grey with no detail. This is the type of noise that is most suitable for screening. FIG. 6 illustrates a modification to the random number generator which improves the visual appearance of the reproduced image by digitally filtering the random output signal to remove some of the low frequency components. The method illustrated involves selecting P adjacent taps on the shift register and inverting alternate outputs.

Figure 7:
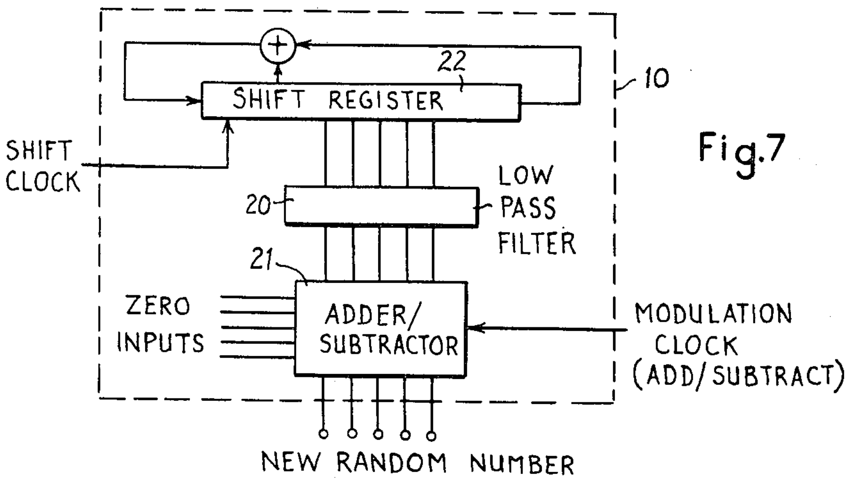
FIG. 7 is a block diagram of yet another embodiment of random number generator.

A more versatile method of noise generation is illustrated in FIG. 7 where the random signal is first low-pass filtered at 20 to remove the high frequency components and then this filtered signal is heterodyned in the adder/substractor 21 to a higher frequency to give a narrow bandwidth noise signal which has nearly all frequency components lying outside the visually resolvable range but inside the printable bandwidth.

The modulation process illustrated in FIG. 7 is a digital equivalent of the ring diode and beam switching tube mixers commonly used in radio practice. The process consists of taking the low pass filtered signal from the shift register 22 and alternately adding it to and subtracting it from zero. These filtering and modulation processes do not affect the statistical properties of the random signals produced, i.e., the probability density function is still uniform and the signal has $2^P$ possible states.

The filtering and modulation process can be extended to two dimensions. A useful feature of the shift register generator is that if the scan is of constant length the values of the shift register states on the next scan can be calculated immediately from the existing states. These values can be combined by a similar method as that described in the aforementioned thesis by J. E. Thomson to generate a two-dimensionally filtered noise signal.

Figure 8:
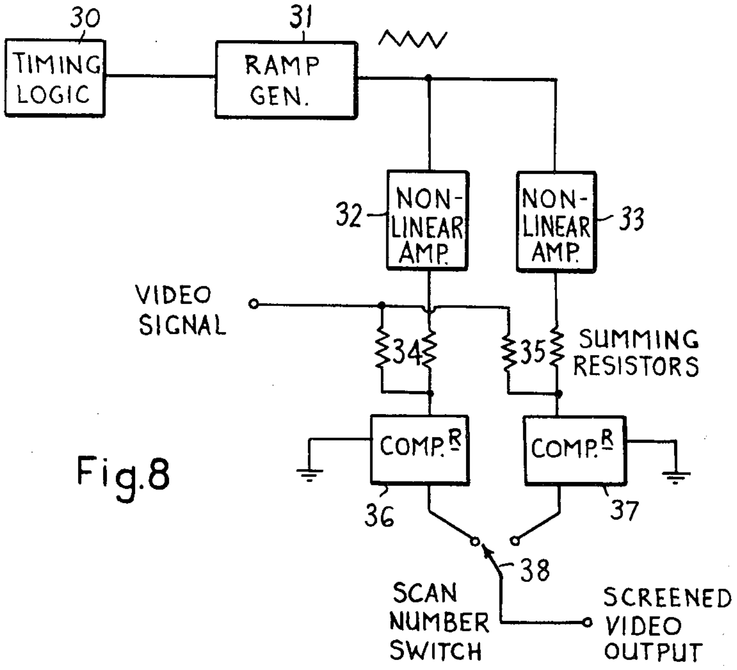
FIG. 8 is a block diagram of a circuit for processing continuous waveforms.

The apparatus described so far depends on the exposure of discrete constant-area units in various combinations along consecutive line scans to build up the dots which constitute the final image. Variable dot-size screening may also be carried out by processing continuous waveforms in the circuit arrangement shown in FIg. 8. In this circuit the timing logic unit 30 controls a ramp generator 31 producing a sawtooth waveform which is fed to non-linear amplifiers 32 and 33, each modifying the sawtooth to a different degree. The output of these amplifiers are respectively fed to summing resistor networks 34 and 35 where they are combined with the video signal and then applied to comparators 36 and 37. The scan number switch 38 represents the selector of the desired comparator output depending upon the portion of a screen dot being produced. This may be regarded as a process similar to the previous variable dot-size system described, but where the number of elements per dot along a scan has grown very large. This means that in general, one is no longer restricted to a fixed number of grey levels for example 60 as described earlier. Indeed one may have an almost continuous grey scale range. Further since the number of elements per dot is now very large, the up-dating process whereby the reproduced dots may be modified during construction in response to rapid changes in the incoming signal, can now take place continuously at a speed only limited by the bandwidth of the video circuits, with no sampling constraints.

Figure 9:
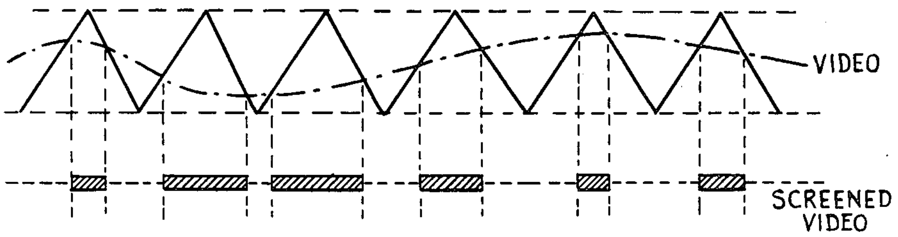
FIGS. 9 to 12 are explanatory waveforms.
Figure 10:
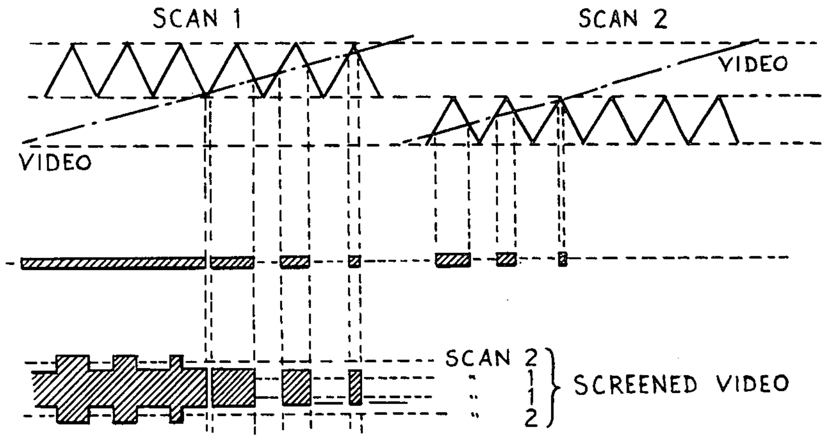
Figure 11:
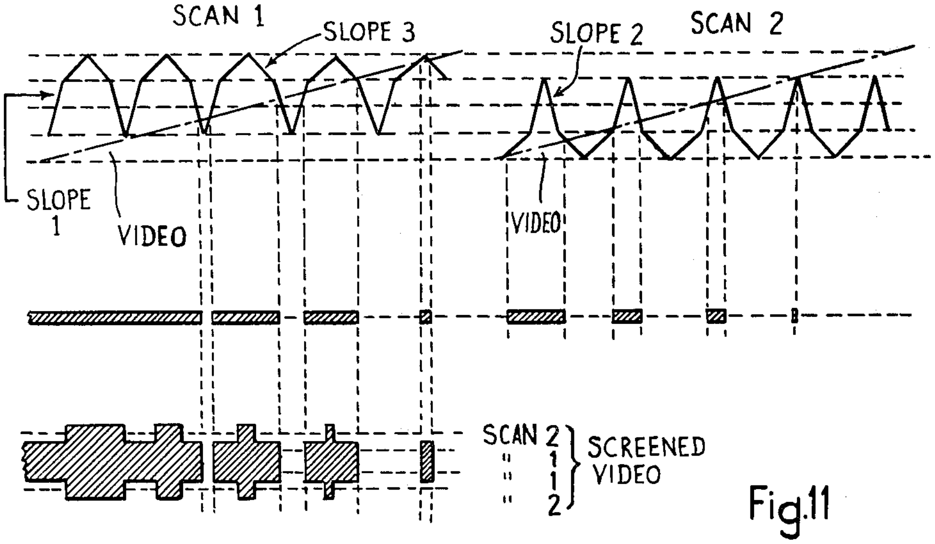

The conventional screening process when applied to a scanned image can be regarded as a form of pulse-width modulation whereby a line of length X is laid down and repeated at intervals of Y. The percentage transmission (or reflection) of the reproduced image is then Y − X/Y. To be a linear process (Y − X) must be directly proportional to the amplitude of the scanned video signal where the signal amplitude represents the percentage optical transmission of the recorded original image. A way of achieving this is by comparing the amplitude of the video signal with a sawtooth waveform and laying a line forming a portion of a dot whenever the sawtooth is larger than the video signal (FIG. 9). However, to create a satisfactory dot structure, it is necessary to use a different sawtooth on successive scans. A simple system would be as FIG. 10, using the same shape sawtooth but shifted in D.C. level for successive scans. If the pattern is repeated scan 1, scan 2, scan 2, scan 1, scan, 1, scan 2 . . . then a dot structure can be built up, a dot being for example four scans high. However such a dot does not have an entirely satisfactory shape. The shape can be improved by combining two sawtooths to produce the waveform shown in FIG. 11. However, the linearity of the system must be preserved by changing the slopes of the sawtooths in the overlap region, so that the ratio:

$$\frac{\%\ \text{increase in dot area}}{\%\ \text{increase in video voltage}}\ \text{is constant}$$

This will be true if $$\frac{1}{\text{SLOPE 1}} + \frac{1}{\text{SLOPE 2}} = \frac{1}{\text{SLOPE 3}} \qquad \text{(FIG. 11)}$$

Where slope 1 and slope 2 refer to the two sawtooths in the overlap region and slope 3 is the slope of both sawtooths outside the overlap region.

The method may be extended to use three sawtooths to give a six-line dot or more sawtooths for larger dots.

Figure 12:
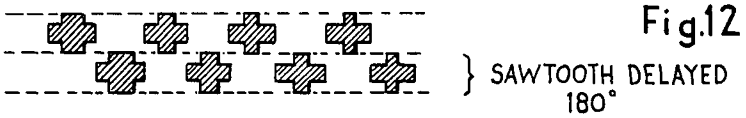

This technique can produce a wide range of screen dot pitches by simple alterations to the timing of the ramp and the sawtooth switching. A wide range of angled screens for colour reproduction for example, can be produced by delaying the sawtooth phase on successive scans and by switching between sawtooths actually during a scan. Such as the simple example in FIG. 12.

Figure 13:
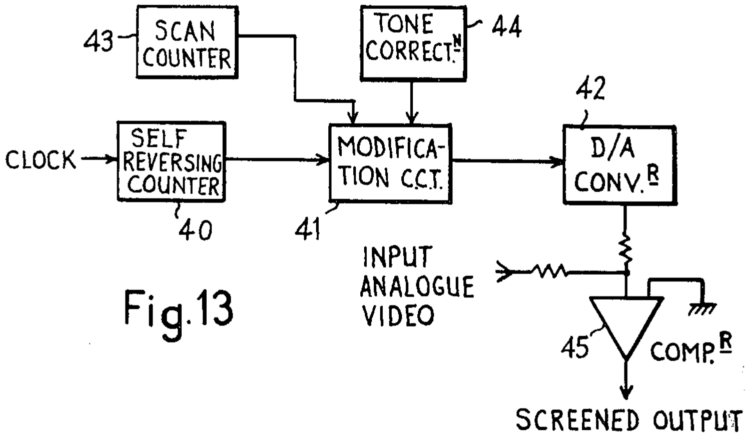
FIG. 13 is a block diagram of a circuit for processing a continuous video waveform with a digital generated sawtooth waveform.

A more flexible system can be produced by using a digital sawtooth generator, for example as shown in FIG. 13. In this embodiment, a fast reversible counter 40 fed with clock pulses, continuously counts up and then down and its output is fed to a digital-to-analogue converter 42, after being digitally modified according to the scan number and any tone correction in the modification circuit 41. Modification of these characteristics is respectively controlled by the circuits 43 and 44. The output of the D/A converter 42 is then a series of sawtooths, as previously described which are then compared with the analogue video signal in a comparator 45. The main advantage of this system is the ease of modification of the screen by digital control signals, so as to cater for a wide range of tone correction (highlight expansion, contraction etc.) as well as enabling variable screen pitches (by changing the counting rate.)

We claim:

1. Apparatus for electronic screening of a graphic image to be reproduced by printing and wherein an analogue video signal representing the optical density variations of said graphic image is continuously produced, said apparatus comprising:

means for generating a range of sawtooth waveforms, means for accepting said analogue video signal, during the generation of each dot which will form a part of the half tone image when reproduced, as a series of successive scans, means for continuously combining successive scans of said analogue video signal with one of said range of sawtooth waveforms selected according to the position in said series of the scan being currently reproduced, and means for deriving an output signal representative of the screened version of said video input signal.

2. Apparatus as claimed in claim 1, comprising a ramp generator for producing a sawtooth waveform, a timing circuit for controlling said ramp generator and means in combination with said ramp generator for producing said range of sawtooth waveforms, network means fed from the output of said ramp generator and means for feeding said analogue video signals to said network means.

3. Apparatus as claimed in claim 2, wherein said means for producing said range of sawtooth waveforms comprises at least two non-linear amplifiers fed from said ramp generator, a separate network means connected to each non-linear amplifier, a separate comparator connected to the output of each network means, and means for selectively deriving said screened video output signal from the outputs of said comparators.

4. A method of electronic screening of a graphic image to be reproduced by printing and wherein an analogue video signal representing the optical density variations of said graphic image is continuously produced, said method including the steps of:

generating a range of sawtooth waveforms, accepting said analogue video signal, during the generation of each dot which will form a part of the half tone image when reproduced, as a series of successive scans, continuously combining successive scans of said analogue video signal with one of said range of sawtooth waveforms selected according to the position in said series of the scan being currently reproduced, and deriving an output signal representative of the screened version of said video input signal.

* * * * *